United States Patent
Niessner et al.

(10) Patent No.: US 11,326,014 B2
(45) Date of Patent: May 10, 2022

(54) VINYL AROMATIC/DIENE-BLOCK COPOLYMERS HAVING GOOD ORGANOLEPTIC PROPERTIES

(71) Applicant: INEOS STYROLUTION GROUP GMBH, Frankfurt am Main (DE)

(72) Inventors: Norbert Niessner, Friedelsheim (DE); Daniel Wagner, Bad Duerkheim (DE); Michiel Verswyvel, Mechelen (BE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 108 days.

(21) Appl. No.: 16/622,520

(22) PCT Filed: Jun. 18, 2018

(86) PCT No.: PCT/EP2018/066077
§ 371 (c)(1),
(2) Date: Dec. 13, 2019

(87) PCT Pub. No.: WO2018/234222
PCT Pub. Date: Dec. 27, 2018

(65) Prior Publication Data
US 2020/0207901 A1    Jul. 2, 2020

(30) Foreign Application Priority Data
Jun. 19, 2017 (EP) .................... 17176589

(51) Int. Cl.
*C08F 297/04* (2006.01)
*C08F 6/10* (2006.01)

(52) U.S. Cl.
CPC .............. *C08F 297/04* (2013.01); *C08F 6/10* (2013.01)

(58) Field of Classification Search
CPC .......... C08F 297/04; C08F 6/10; C08L 53/02; C08L 2207/322; C08L 91/00; C08J 3/201; C08J 5/18; C08J 2353/02; C08J 2491/00
See application file for complete search history.

(56) References Cited

U.S. PATENT DOCUMENTS

| | | | |
|---|---|---|---|
| 5,185,400 A * | 2/1993 | Farrar, Jr. ............... | C08L 25/06 525/98 |
| 5,852,124 A | 12/1998 | Wang et al. | |
| 6,031,053 A | 2/2000 | Knoll et al. | |
| 6,197,889 B1 | 3/2001 | Knoll et al. | |
| 7,282,536 B2 | 10/2007 | Handlin, Jr. | |
| 2002/0107323 A1 | 8/2002 | Uzee et al. | |
| 2015/0183917 A1 | 7/2015 | Knoll et al. | |

FOREIGN PATENT DOCUMENTS

| | | | |
|---|---|---|---|
| CA | 1321852 C | 8/1993 | |
| EP | 0283460 A2 * | 9/1988 | ............... C08C 2/06 |
| EP | 0283460 A2 | 9/1988 | |
| EP | 0316671 A2 | 5/1989 | |
| EP | 2867267 B1 | 8/2016 | |
| WO | 95/35335 A1 | 12/1995 | |
| WO | 97/40079 A1 | 10/1997 | |
| WO | 02/22733 A2 | 3/2002 | |
| WO | WO-0222733 A2 * | 3/2002 | ............... C08L 53/02 |
| WO | 2012/055919 A1 | 5/2012 | |

OTHER PUBLICATIONS

International Preliminary Report on Patentability in International Application No. PCT/EP2018/066077, dated Oct. 7, 2019.
International Search Report and Written Opinion in International Application No. PCT/EP2018/066077, dated Sep. 13, 2018.

* cited by examiner

*Primary Examiner* — Robert D Harlan
(74) *Attorney, Agent, or Firm* — J.A. Lindeman & Co. PLLC (57) ABSTRACT

The invention relates to a vinyl aromatic/diene-block copolymer A, obtained by an anionic polymerization of a monomer composition, comprising: A1: 60-95 wt.-% of at least one vinyl aromatic monomer, and A2:5-40 wt.-% of at least one diene monomer, wherein the vinyl aromatic/diene-block copolymer A in total comprises less than 10 parts per million (ppm) of acetaldehyde, methacrolein and styrene based on the total amount of vinyl aromatic/diene-block copolymer A; the vinyl aromatic/diene-block copolymer A has improved orgnoleptic properties and is in particular suitable for producing food packaging materials.

13 Claims, 5 Drawing Sheets

VINYL AROMATIC/DIENE-BLOCK COPOLYMERS HAVING GOOD ORGANOLEPTIC PROPERTIES

The invention relates to vinyl aromatic/diene-block copolymers with improved organoleptic properties, as well as to methods of processing of vinyl aromatic/diene-block copolymers having improved organoleptic properties. Furthermore, the invention relates to polymer blends of vinyl aromatic/diene block copolymers with thermoplastic polymers, in particular with styrene homopolymers and/or copolymers. The products obtained according to the invention can be used for the production of moldings, plates, films and thermoformed parts.

Vinyl aromatic/diene-block copolymers, especially styrene/butadiene-block copolymers (SBC), are often used in a blend with standard polystyrene (PS) or styrene/methyl methacrylate copolymers (SMMA) for the manufacture of tough, transparent articles. The preparation is generally effected by sequential anionic polymerisation and optionally subsequent coupling, for example with epoxidized soybean oil or epoxidized linseed oil. In view of potentional applications, it is desirable to prepare styrene/butadiene-block copolymers which, especially in mixtures with PS or SMMA, have both a high toughness efficiency, good transparency and thermostability, thus ensuring a broad range of applications for this polymer class.

In applications of food packaging, it is observed that anionic styrene/butadiene-block copolymers can affect the organoleptic profile of closed and/or sealed food packaging applications in a negative way. It has therefore been one object to provide vinyl aromatic/diene-block copolymers with good characteristics in terms of toughness and transparency and which exhibit neutral organoleptic properties, i.e. have a low odor and/or taste.

This object is solved by the vinyl aromatic/diene-block copolymers according to the present invention which are obtainable by the process according to the invention.

The present invention relates to vinyl aromatic/diene-block copolymer A, obtained by an anionic polymerization of a monomer composition, comprising:

A1: 60-95 wt.-%, based on the total weight of the monomer composition, of at least one vinyl aromatic monomer, and
A2: 5-40 wt.-%, based on the total weight of the monomer composition, of at least one diene monomer, wherein the vinyl aromatic/diene-block copolymer A in total comprises less than 10 parts per million (ppm), more preferably less than 5 ppm and in particular less than 2 ppm of acetaldehyde, methacrolein and styrene based on the total amount of vinyl aromatic/diene-block copolymer A.

According to the present invention, the term vinyl aromatic/diene-block copolymer refers to a block copolymer obtained by copolymerization of vinyl aromatic monomers (i.e. monomers comprising at least one aromatic moiety and at least one vinyl group) and diene monomers (i.e. monomers comprising at least two conjugated carbon-carbon-double bonds).

Suitable vinyl aromatic monomers A1 are in particular styrene, α-methyl styrene, o-, m- and p-substituted alkyl styrenes, vinyl naphthalene and/or 1,1-diphenyl-ethylene, preferably styrene, α-methyl styrene, o-, m-, p-substituted alkylstyrenes such as o-, m- and/or p-methylstyrene, more preferably styrene, α-methyl styrene. Most preferably, the vinyl aromatic monomer A1 is styrene. One single type of vinyl aromatic monomer A1 may be used alone. Alternatively, mixtures of two or more different vinyl aromatic monomers A1 can be used.

Suitable diene monomers A2 are in particular conjugated dienes selected from 1,3-dienes, preferably 1,3-butadiene, isoprene, 2,3-dimethylbutadiene, 1,3-pentadiene and mixtures thereof. More preferred are 1,3-butadiene and 2-methyl-1,3-butadiene and in particular 1,3-butadiene.

In a preferred embodiment of the invention, the at least one vinyl aromatic monomer is selected from styrene, α-methyl styrene and mixtures thereof and the at least one diene monomer is selected from 1,3-butadiene and 2-methyl-1,3-butadiene and mixtures thereof.

Preferably, the vinyl aromatic/diene-block copolymer A has a diene content of 15 to 40 wt.-% based on the total weight of the vinyl aromatic/diene-block copolymer A. Styrene/butadiene-block copolymers, which consist only of short chains of high butadiene content, impair transparency in admixture with standard polystyrene, while high molecular weight block polymers with very low butadiene content behave brittle. Vinyl aromatic/diene-block copolymers A having a diene content of 15 to 40 wt.-%, based on the total weight of the vinyl aromatic/diene-block copolymers A, are characterized by combining a good toughness efficiency with a good toughness/stiffness ratio.

The vinyl aromatic/diene-block copolymer A may be seleced from symmetrically and asymmetrically constructed linear, brachend and star-branched vinyl aromatic/diene-block copolymer A. These block copolymers are generally known in the art and may be prepared by any known method. Typically, anionic polymerization processes are applied. Examples of polymerization methods may be found e.g. in WO 95/35335, U.S. Pat. No. 7,282,536, EP 2 867 267, EP 0 316 671, WO 97/40079, WO 2012/055919.

Some preferred vinyl aromatic/diene-block copolymers A are for example:

Linear styrene/butadiene-triblock copolymers of the structure S-(S/B)-S, wherein the amount of the monomers in the total block copolymer is 35 wt.-% of butadiene and 65 wt.-% of styrene and the weight ratio of the blocks is 16/68/16. The afore-mentioned linear styrene/butadiene-block copolymers are commercially available as Styroflex® 2G 66 from INEOS Styrolution (Frankfurt, Germany).

Star shaped block copolymers with terminal styrene hard blocks and a styrene comprising middle block B/S, with 25 wt.-% butadiene, based on the entire block copolymer. These copolymers are commercially available as Styrolux® 693 D or Styrolux® 684 D from INEOS Styrolution (Frankfurt, Germany).

Star shaped SBS (styrene/butadiene/styrene)-block copolymers, the amount of butadiene in the total block copolymer being 26 wt.-% and that of styrene 74 wt.-% based on the total weigt of the SBS-block copolymer. These copolymers are commercially available as Styroclear® GH 62 from INEOS Styrolution (Frankfurt, Germany).

It has been found by the present inventors that the organoleptic properties of vinyl aromatic/diene-block copolymers A may be significantly improved, if the amount of volatile organic compounds and in particular the amount of acetaldehyde, methacrolein and styrene is reduced. Volatile organic compounds such as acetaldehyde, methacrolein and styrene may be present as impurities of the monomers, as unreacted monomers, or as degradation products of the polymers which are formed during processing, especially at high temperatures and in the presence of atmospheric air, in the anionically polymerized vinyl aromatic/diene-block copolymer A. It was found that acetaldehyde, methacrolein and styrene act as marker for volatile organic compounds which are prone to influence the organic properties of the vinyl aromatic/diene-block copolymers A. Thus, a vinyl aromatic/diene-block copolymer A in total comprising less than 10 parts per million (ppm), more preferably less than 5 ppm and in particular less than 2 ppm of acetaldehyde, methacrolein and styrene, based on the total amount of vinyl aromatic/diene-block copolymer A, has been found to have overall improved organoleptic properties.

One object of the present invention is a vinyl aromatic/diene-block copolymer A, in total comprising less than 400 ppm, preferably less than 200 ppm, in particular less than 100 ppm, based on the total amount of vinyl aromatic/diene-block copolymer A, of the following volatile organic compounds: acetaldehyde, isobutene, ethanol, acroleine, propanal, methacroleine, 2-methylpentane, 3-methalpentane, 2-methyl-2-butanol, methylcyclopentane, 4-vinylcyclohexene, ethylbenzene, phenylacetylene, styrene, oxylene, isopropylbenzene, allylbenzene, n-propylbenzene, α-methylstyrene, cyclohexane and n-hexane.

A further object of the invention is a vinyl aromatic/diene-block copolymer A, in total comprising less than 100 ppm, preferably less than 50 ppm, in particular less than 30 ppm, based on the total amount of vinyl aromatic/diene-block copolymer A, of the following volatile organic compounds: acetaldehyde, isobutene, ethanol, acroleine, propanal, methacroleine, 2-methylpentane, 3-methalpentane, 2-methyl-2-butanol, methylcyclopentane, 4-vinylcyclohexene, ethylbenzene, phenylacetylene, styrene, oxylene, isopropylbenzene, allylbenzene, n-propylbenzene, and α-methylstyrene, i.e. disregarding the presence of cyclohexane and n-hexane.

A futher object of the present invention is a vinyl aromatic/diene-block copolymer A, comprising in total less than 300 parts per billion (ppb), preferably less than 250 ppb, based on the total amount of vinyl aromatic/diene-block copolymer A, of styrene.

A futher object of the present invention is a vinyl aromatic/diene-block copolymer A, comprising in total less than 300 ppb, preferably less than 250 ppb, based on the total amount of vinyl aromatic/diene-block copolymer A, of acetaldehyde.

A futher object of the present invention is a vinyl aromatic/diene-block copolymer A, comprising in total less than 700 ppb, preferably less than 600 ppb, based on the total amount of vinyl aromatic/diene-block copolymer A, of methacrolein.

A futher object of the present invention is a vinyl aromatic/diene-block copolymer A, comprising in total less than 400 ppb, preferably less than 350 ppb, based on the total amount of vinyl aromatic/diene-block copolymer A, of isobutene.

A futher object of the present invention is a vinyl aromatic/diene-block copolymer A, comprising in total less than 90 ppb, preferably less than 80 ppb, based on the total amount of vinyl aromatic/diene-block copolymer A, of propanal.

A futher object of the present invention is a vinyl aromatic/diene-block copolymer A, comprising in total less than 1750 ppb, preferably less than 1600 ppb, in particular less than 1500 ppb, based on the total amount of vinyl aromatic/diene-block copolymer A, of styrene, acetaldehyde, methacrolein, isobutene and propanal.

Unless otherwise noted, all amounts of volatile organic compounds referred to herein are determined using gas chromatography and mass spectrometry. In particular, headspace gas chromatography is used for separation of the volatile organic compounds and mass spectrometry, perferabyl quadrupol mass spectrometry, is used fo the identification of the volatile organic compounds. A detailed description of the preferred determination method is given in the example section.

In order to prevent the formation of acetaldehyde, methacrolein and styrene as degradation products during the processing of the vinyl aromatic/diene-block copolymer A, at least one stabilizer is preferably added to the vinylaromatic/diene-block copolymer A.

The invention also relates to a vinyl aromatic/diene-block copolymer A further comprising at least one stabilizer, selected from a phenol-based stabilizer or a phosphite-based stabilizer. These stabilizers have been found to have a particularly good stabilizing effect with regard to the degradation of anionically polymerized vinyl aromatic/diene-block copolymers A.

In a preferred embodiment, the vinyl aromatic/diene-block copolymer A comprises at least one stabilizer selected from the group consisting of pentaerythritol-tetrakis(3-(3,5-di-tert-butyl-4-hydroxyphenyl)propionate (commercially available as IRGANOX® 1010, BASF SE), oxtadecyl-3-(3,5-di-tert-butyl-4-hydroxyphenyl)propionate (commercially available as IRGANOX® 1076), 4-((4,6-Bis(octylthio)-1,3,5-triazin-2-yl)amino)-2,6-ditert-butylphenol (commercially available as IRGANOX® 565), 2-[1-(2-hydroxy-3,5-di-tert-pentylphenyl)ethyl]-4,6-di-tert-pentylphenyl acrylate (commercially available SUMLIZER® GS), 6-[3-(3-t-Butyl-4-hydroxy-5-methylphenyl)propoxy]-2,4,8,10-tetra-t-butyldibenzo[d,f][1,3,2]dioxaphos-phepin (commercially available as SUMILIZER® GP), 2-tert-Butyl-6-(3-tert-butyl-2-hydroxy-5-methylbenzyl)-4-methylphenyl acrylate (commercially available as SUMILIZER® GM) and tris(2,4-di-t-butylphenyl)phosphite (commercially available as IRGAFOS® 168) and mixtures thereof.

These stabilizers have surprisingly been found to be extremely advantageous for the stabilization of vinyl aromatic/diene-block copolymers A.

In one embodiment of the invention, the at least one stabilizer is comprised in an amount of 0 to 5 wt.-%, preferably 0.1 to 2 wt.-%, based on the total amount of the vinyl aromatic/diene-block copolymer A.

These specific amounts provide sufficient stabilization to suppress the formation of the undesired volatile organic compounds and in particular acetaldehyde, methacrolein and styrene during the preparation and processing of the the vinyl aromatic/diene-block copolymer A.

A further object of the invention is a polymer composition P, comprising at least one vinyl aromatic/diene-block copolymer A and at least one styrene homopolymer or styrene copolymer different from the vinyl aromatic/diene-block copolymer A. Due to the reduced amount of acetaldehyde, methacrolein and styrene, these polymer compositions P show good properties for packaging applications, in particular for the packaging of foods. Preferably, the polymer composition P comprises 10 to 90 wt.-%, preferably 30 to 70 wt.-%, based on the total weight of the polymer composition P, of at least one vinyl aromatic/diene-block copolymer A and 10 to 90 wt.-%, preferably 30 to 70 wt.-%, based on the total weight of the polymer composition P, of least one styrene homopolymer or styrene copolymer different from the vinyl aromatic/diene-block copolymer A.

In a preferred embodiment of the invention, the at least one styrene homopolymer or styrene copolymer is selected from standard polystyrene (PS) and poly(styrene-co-methyl methacrylate) (SMMA).

In a preferred embodiment, the SMMA copolymer comprises at least one copolymer obtained by the polymerization of 70 to 90 wt.-%, based on the total weight of the monomer composition, of styrene and 10 to 30 wt.-%, based on the total weight of the monomer composition, of methyl methacrylate.

In a further preferred embodiment, the amount styrene is from 70 to 85 wt.-% and the amount of methyl methacrylate is from 15 to 30 wt.-%. In particular preferred embodiment, SMMA copolymers having an amount of styrene present in the SMMA copolymer is from 70 to 80 wt.-% and the amount of methyl methacrylate present in the SMMA copolymer is from 20 to 30 wt.-%. Most preferred are SMMA copolymers wherein the amount of styrene present in the SMMA copolymer is from 84 to 80 wt.-% and the amount of methyl methacrylate present in the SMMA copolymer is from 20 to 26 wt.-%.

Said SMMA copolymers are known products which are commercially available from INEOS Styrolution GmbH (Frankfurt, Germany) as NAS® 21, NAS®30, and NAS® 90.

The invention further relates to a method for preparing and processing a vinyl aromatic/diene-block copolymer A or a polymer composition P as defined above.

The vinyl aromatic/diene-block copolymer A is prepared by an anionic polymerization process. Any anionic polymerization process known in the art my be applied for this purpose.

Following the polymerization process, the vinyl aromatic/diene-block copolymer A is substantially separated from any solvent which might be used during the polymerization process. Substantially separated means that the composition obtained from the reaction mixture is rich of vinyl aromatic/diene-block copolymer A and comprises preferably less than 10 wt.-%, preferably less than 5 wt.-%, based on the composition obtained from the reaction mixtures, of solvent.

The vinyl aromatic/diene-block copolymer A is optionally combined with at least one styrene homopolymer or styrene copolymer and/or at least one stabilizer. Both constituents may be added during or after the polymerization process, but prior to optional removal of solvent. Alternatively, the optional constituents may be added after the polymerization process and prior to the processing of the vinyl aromatic/diene-block copolymer A.

The invention also relates to a method for processing the vinyl aromatic/diene-block copolymer A disclosed above, wherein the method comprises at least the following steps:
a) Optionally mixing the vinyl aromatic/diene-block copolymer A with at least one styrene homopolymer and/or styrene copolymer and/or at least one stabilizer in the predetermined amounts to obtain a homogenous material mixture; and
b) Extruding the homogenous material mixture at temperatures above the glass transition point of the vinyl aromatic/diene-block copolymer A to obtain a processed vinyl aromatic/diene-block copolymer A or a polymer composition P.

The constituents are typically provided in form of particulate materials having different particle sizes and particle size distributions. Typically, the components are provided in form of powders and/or granules. These may, for example, be chosen with respect to their commercial availability.

The particulate constituents are provided to a mixing device in the required amounts and ratios as previously indicated and subsequently mixed in order to obtain a homogenous material mixture. This may require 1 to 60 minutes, preferably 1 to 20 minutes, in particular 2 to 10 minutes, depending to the amount of particulate material to be mixed.

The thus obtained homogenous material mixture is then transferred to an optionally heatable mixing apparatus, producing a substantially liquid-melt polymer mixture. In an alternative embodiment, the constituents are directly fed to the optially heatable mixing apparatus without prior mixing.

"Substantially liquid-melt" means that the polymer mixture, as well as the predominant liquid-melt (softened) fraction, may further comprise a certain fraction of solid constituents, examples being unmelted fillers and reinforcing material such as glass fibers, metal flakes, or else unmelted pigments, colorants, etc. "Liquid-melt" means that the polymer mixture is at least of low fluidity, therefore having softened at least to an extent that it has plastic properties.

Mixing apparatuses used are those known to the skilled person. The vinyl aromatic/diene-block copolymer A and—where included—styrene homopolymer or styrene copolymer and/or the stabilizer may be mixed, for example, by joint extrusion, kneading, or rolling, the aforementioned components necessarily having been isolated from the aqueous dispersion or from the aqueous solution obtained in the polymerization.

Examples of mixing apparatus for implementing the method includes discontinuously operating, heated internal kneading devices with or without RAM, continuously operating kneaders, such as continuous internal kneaders, screw kneaders with axially oscillating screws, Banbury kneaders, furthermore extruders, and also roll mills, mixing roll mills with heated rollers, and calenders.

A preferred mixing apparatus used is an extruder. Particularly suitable for melt extrusion are, for example, single-screw or twin-screw extruders. A twin-screw extruder is preferred. Furthermore preferred are extruders having a plurality of degassing openings, in particular degassing domes. Degassing is preferably achieved under reduced pressure, e.g. in a degassing dome. In a preferred embodiment, the extruder comprises at least 1, preferably 1 to 10, in particular 2 to 5 degassing domes. Such extruders are also referred to as degassing extruders.

In some cases the mechanical energy introduced by the mixing apparatus in the course of mixing is enough to cause the mixture to melt, meaning that the mixing apparatus does not have to be heated. Otherwise, the mixing apparatus is generally heated.

The temperature is guided by the chemical and physical properties of the diene-block copolymer A and—where included—styrene homopolymer or styrene copolymer and/or the stabilizer, and should be selected such as to result in a substantially liquid-melt polymer mixture.

On the other hand, the temperature is not to be unnecessarily high, in order to prevent thermal damage of the polymer mixture. The mechanical energy introduced may, however, also be high enough that the mixing apparatus may even require cooling. Mixing apparatus is operated customarily at 150 to 400° C., preferably 170 to 300° C.

In a preferred embodiment a heatable twin-screw extruder and a speed of 50 to 250 rpm, preferably 100 to 200 rpm is employed. Preferably, an extruding temperature of 160 to 270° C., preferably 180 to 250° C. is employed for processing of the diene-block copolymer A. The processed diene-block copolymer A may be directly used, e.g. in moulding processes, preferably injection moulding processes, or may be processed to form granules which may be subjected to moulding processes afterwards. The moulding processes are preferably carried out at temperatures of 160 to 270° C., in particular 180 to 250° C. to result in polymer moulded articles, e.g. by thermoforming, extruding, injection molding, calendaring, blow molding, compression molding, press sintering, deep drawing or sintering, preferably by injection molding.

According to the inventive method for processing, a polymer melt is formed from the vinyl aromatic/diene-block copolymer A or the polymer composition P and water is dosed to the polymer melt during the processing.

It was found that the addition of water to the polymer melt during the processing ensures that the amount of volatile organic compounds, and in particular the amount of acetaldehyde, methacrolein and styrene, in the processed polymer is kept low even at high processing temperatures. Without being bound to theory, it is believed that the water is vapor stripping the off-odour components out of the polymer melt. Thus, the water removes the voltatile organic components from the polymer melt. Accordingly, water is preferably added in the degassing extruder after the first atmosperheric (backward) degassing and first degassing dome. Water can also be added between each subsequent degassing dome in the degassing extruder.

In a further embodiment of the invention, the method for processing a vinyl aromatic/diene-block copolymer A or a polymer composition P further comprises the reduction of the oxygen concentration of the ambient air in contact with the polymer melt. It was found that contact with oxygen is crucial for the formation of organoleptically active volatile organic compounds at high, typical polymer processing temperatures.

This measure therefore further ensures that the amount of volatile organic compounds, and in particular the amount of acetaldehyde, methacrolein and styrene, in the processed polymer is kept low even at high processing temperatures. The oxygen concentration of the ambient air in contact with the polymer melt may be reduced by different approaches.

In one embodiment of the invention, the polymer melt is provided in a polymer melt discharge device of a polymer processing device and the oxygen concentration compared to ambient air is reduced by providing the polymer melt discharge device with a sealing. In a preferred embodiment, the sealing of the polymer melt discharge device is obtained by continuously feeding of the polymer melt to the polymer melt discharge device. This measure effectively reduces the amount of oxygen being in contact with the polymer melt.

In a further preferred embodiment, a chemically inert fluid is fed to the polymer melt discharge device. The fluid may be selected from at least one chemically inert solvent and/or at least one chemical inert gas. In one embodiemten, the chemical inert fluid may comprise at least one chemically inert solvent and at least one chemical inert gas in combination.

Preferably, the at least one chemical inert soviet is selected from at least one liquid hydrocarbon compound. More preferably at least one liquid hydrocarbon compound with 4 to 30, in particular 5 to 12, carbon atoms is selected as chemically inert solvent. Examples include but are not limited to pentane, hexane, heptane, octane, nonane, decane, undecane, dodecane, toluene, xylene and mesitylene. Particular preference is given to toluene, xylene, mesitylene and mixtures thereof.

The at least one chemical inert gas is preferably selected from known inert gases such as $CO_2$, noble gases and nitrogen. From the viewpoint of inertness and commercial availability, $CO_2$, nitrogen and argon are particular preferred inert gases.

The addition of inert fluids has the effect that contact of the polymer melt with oxygen from ambient air is effectively suppressed. Due to their low vapor pressure, the chemical inert solvent is vaporized at the processing temperatures during the processing of the polymer melt and replaces oxygen from ambient air out of the polymer melt discharge device of the polymer processing device. The inert gases achieve this effect without the need for evaporation.

In a preferred embodiment of the invention, the chemically inert fluid, in particular the chemical inert solvent, is fed to the polymer melt discharge device in an amount that ensures that the concentration of the chemically inert fluid, in particular the chemical inert solvent, in the processed product is at least >100 ppm for up to 1 week after processing, based on the total amount of processed product. It was found that this amount is sufficient to prevent a rise of the amount of acetaldehyde, methacrolein and styrene, in the processed polymer increases above 10 ppm, based on the total vinyl aromatic/diene-block copolymer A. In a further preferred embodiment, the amount of the chemically inert fluid, in particular the chemical inert solvent, in the processed polymer product is still at least ≥200 ppm and ≤1000 ppm, in particular ≤500 ppm, for up to 1 week after processing, based on the total amount of processed product.

The method for processing a vinyl aromatic/diene-block copolymer A or a polymer composition P results in typical processed polymer products, in particular selected from granules, powder, and crumps.

A further object of the present invention is a processed product of a vinyl aromatic/diene-block copolymer A or a polymer composition P, obtainable by a method for processing described above.

The vinyl aromatic/diene-block copolymer A and/or the polymer composition P is preferably used for producing molded bodies and/or films. In a further preferred embodiment the vinyl aromatic/diene-block copolymer A and/or the polymer composition is used for producing packaging material for food. Due to low amounts of acetaldehyde, methacrolein and styrene, accompanied with low amounts of other volatile organic compounds, the vinyl aromatic/diene-block copolymer A and/or the polymer composition P have improved organleptic properties and thus do not adversely affect the smell and/or taste of the packed product, in particular the food product.

The following examples, Figures and claims further illustrate the invention.

EXAMPLES

Various, commercially available styrene/butadiene-block copolymers (hereinafter also referred to as SBC) were used to carry out the examples and comparative examples below. The following were selected:

| | |
|---|---|
| (A) | Styrolux ® 693D, Ineos Styrolution Group GmbH |
| (B) | Styrolux ® 684D, Ineos Styrolution Group GmbH |
| (C) | Styroclear ® GH 62, Ineos Styrolution Group GmbH |
| (D) | K-Resin ® KX40, Ineos Styrolution Group GmbH |
| (E) | K-Resin ® KR03, Ineos Styrolution Group GmbH |
| (F) | Finaclear ® 520, Total Petrochemicals |
| (G) | Asafex ™ 810, Asahi Kasei Corporation |
| (H) | Styroflex ® BX 6425, Ineos Styrolution Group GmbH |
| (I) | Styroflex ® 2G66, Ineos Styrolution Group GmbH |

Testing of Organoleptic Properties

First, the organoleptic behavior of various SBCs was investigated. For this purpose, about 50 g of SBC granules each were introduced into Erlenmeyer flasks and were each doused with about 200 ml of boiling, demineralized water. As reference, an Erlenmeyer flask without SBC, which also contains about 200 ml of boiling water is used. The flasks were sealed with a glass cover and allowed to cool over a period of about 4 minutes. Odor samples of the gas space of the respective flasks were evaluated by a group (up to 10 persons) according to the following classification:
1=neutral, no odor compared to reference sample
2=slight but acceptable odor
3=more disagreable odor
4=very akward odor The commercially available SBC granules were subjected to various pretreatments prior to carrying out the described evaluation process. The first evaluation with SBC granule samples taken directly from the commercially available package of the respective SBC granules typically received a rating of 1.2 to 2.2. Carefully degassing the SBC granules at 45° C. in a vacuum dryer for 48 hours typically resulted in a significant improvement in organoleptic assessment. Re-processing the degassed material at a temperature of 220-240° C. (recommended process parameters) in a lab twin-screw extruder resulted in a third evaluation of the re-granulated polymer to a typical rating of 1.9. The results are summarized in Table 1.

TABLE 1

| SBC sample | Example 1 Untreated (as supplied) | Example 2 After degassing | Example 3 After re-processing |
|---|---|---|---|
| (A) | 1.9 | 1.6 | 2.7 |
| (A) | 1.8 | 1.5 | 2.6 |
| (B) | 1.7 | 1.2 | 2.6 |
| (B) | 1.7 | 1.4 | 2.7 |
| (C) | 2 | 1.3 | 2.8 |
| (D) | 1.2 | 1.2 | 2.3 |
| (E) | 1.5 | 1.4 | 2.4 |
| (F) | 2.2 | 1.4 | 2.3 |
| (G) | 2 | 2.1 | 2.9 |
| (H) | 1.6 | 1.2 | 1.9 |
| (I) | 2 | 1.5 | 3.3 |

These results show that organoleptically flawless granules also develop a distinct, unpleasant odor during processing. The processing of the SBC granules thus adversely affects the organoleptic properties of the polymer.

Investigation of the Influence of Oxygen

Figure 1A:
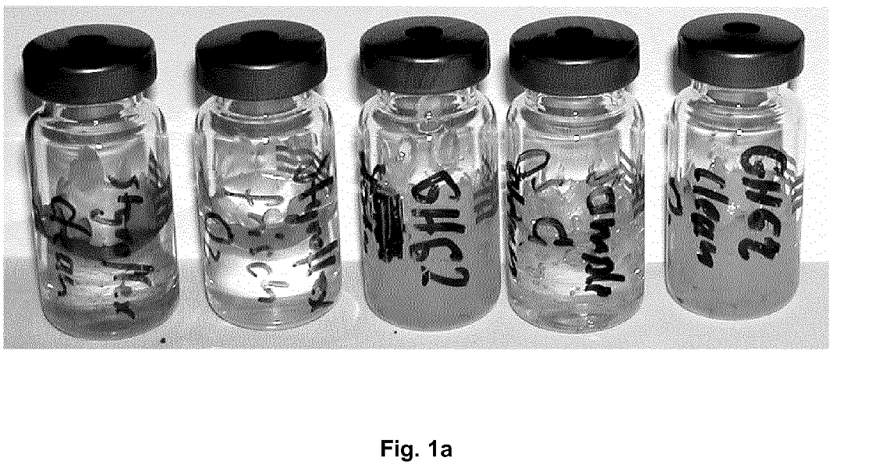
FIG. 1a shows samples of commercial SBC granules which were heated to 230° C. under air.

Fresh commercial SBC granules were heated either under air or under argon atmosphere and held at about 230° C. for 20-30 min. It was observed that in the presence of oxygen a strong new formation of the organoleptically perceptible substances and a clear yellow coloration of the polymer melt occurs. The samples are shown in FIG. 1a.

Figure 1B:
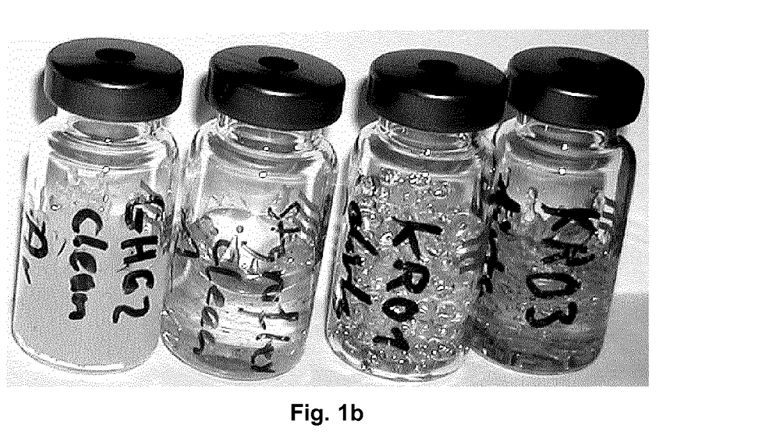
FIG. 1b shows samples of commercial SBC granules which were heated to 230° C. under argon atmosphere.

In the samples heated under argon atmosphere, only a small new formation of organoleptically perceptible substances and no yellow coloration were observed. The samples are shown in FIG. 1b.

Determination of Organoleptically Perceptible Substances

The organoleptically perceptible substances, which are contained in the individual commercially available SBC granules, were measured using headspace gas chromatography mass spectrometry (GC-MS).

The GC machine has the following characteristics:
GC machine: HP 5700A Detector: FID
Column: Sil 5 (length=25 m, ID=0.15; film thickness: 1.2 µm)
The following temperature program is used:
Start—2 min at 40° C.—10° C./min ramp till 240° C.—8 min at 240° C.—End Sample Preparation:

5 g of the respective granules were placed in a sealed, air-tight vial and heated to 120° C. for 1 h. Samples were taken from the headspace and injected to the separating column of the GC device.

The volatile organic compounds were detected by a flame ionization detector and identified by a quadrupole mass spectrometer. The following compounds of Table 2 were detected:

| | |
|---|---|
| (a) | Acetaldehyde |
| (b) | Isobutene |
| (c) | Ethanol |
| (d) | Acroleine |
| (e) | Propanal |
| (f) | Methacroleine |
| (g) | 2-methylpentane |
| (h) | 3-methalpentane |
| (i) | n-hexane |
| (j) | 2-methyl-2-butanol |
| (k) | Methylcyclopentane |
| (l) | Cyclohexane |
| (m) | 4-vinylcyclohexene |
| (n) | Ethylbenzene |
| (o) | Phenylacetylene |
| (p) | Styrene |
| (q) | o-xylene |
| (r) | Isopropylbenzene |
| (s) | Allylbenzene |
| (t) | n-propylbenzene |
| (u) | α-methylstyrene |
| (v) | not identified |

Figure 2A:
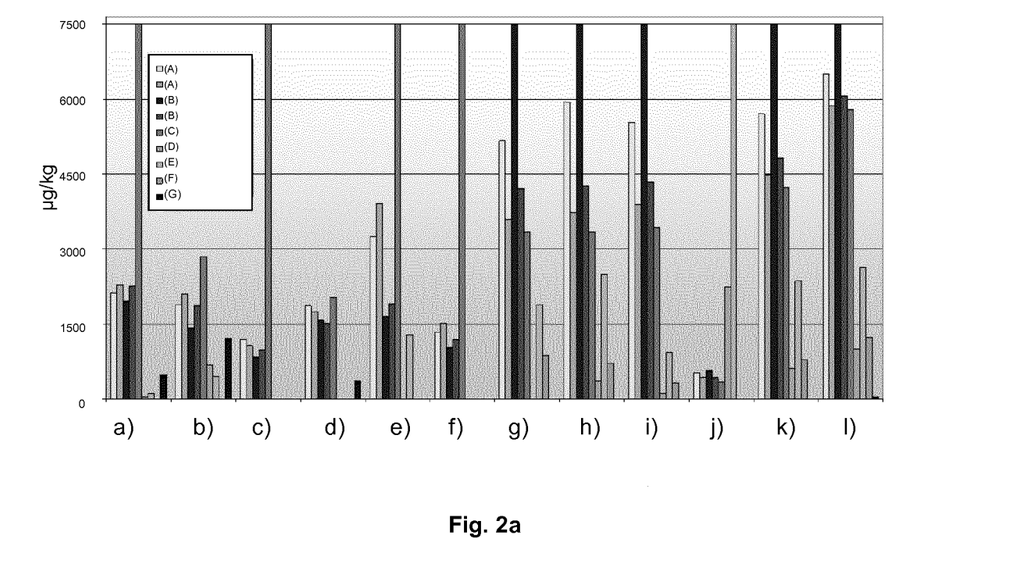
FIGS. 2a and 2b show the results of a headspace GC-MS chromatography of commercial SBC granules which were heated to 120° C. in an air-tight vial.
Figure 2B:
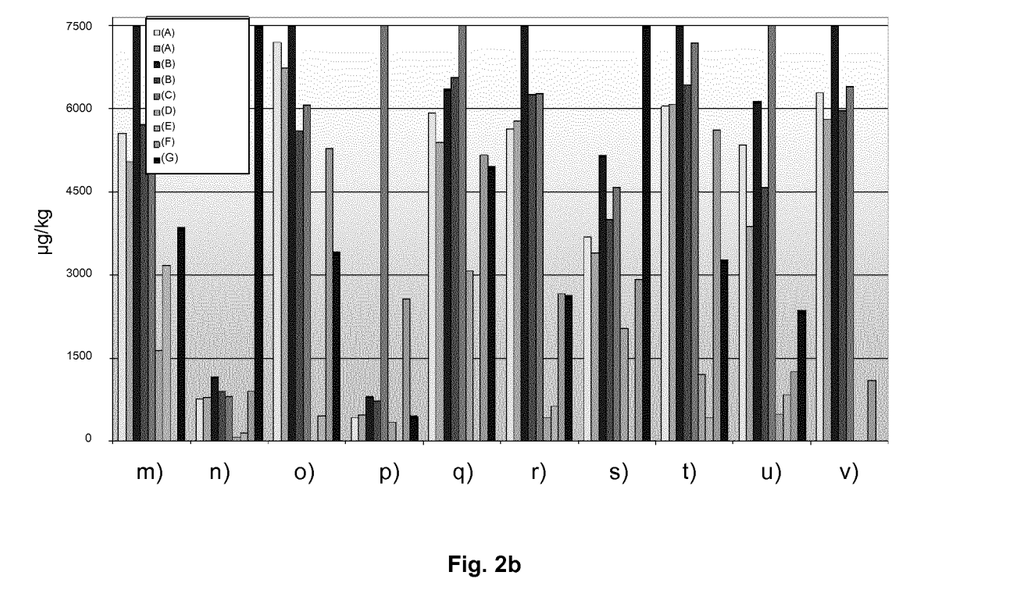

The exact measured values in µg/kg (i.e. parts per billion, ppb) are graphically shown in FIGS. 2a and 2b.

Figure 3A:
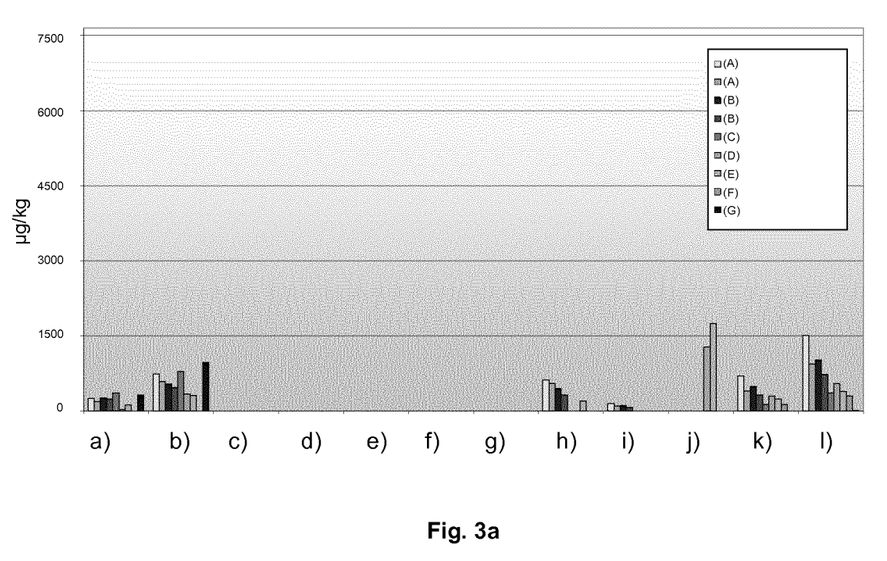
FIGS. 3a and 3b show the results of a headspace GC-MS chromatography of commercial SBC granules which were degassed at 45° C. and then heated to 120° C. in an air-tight vial.
Figure 3B:
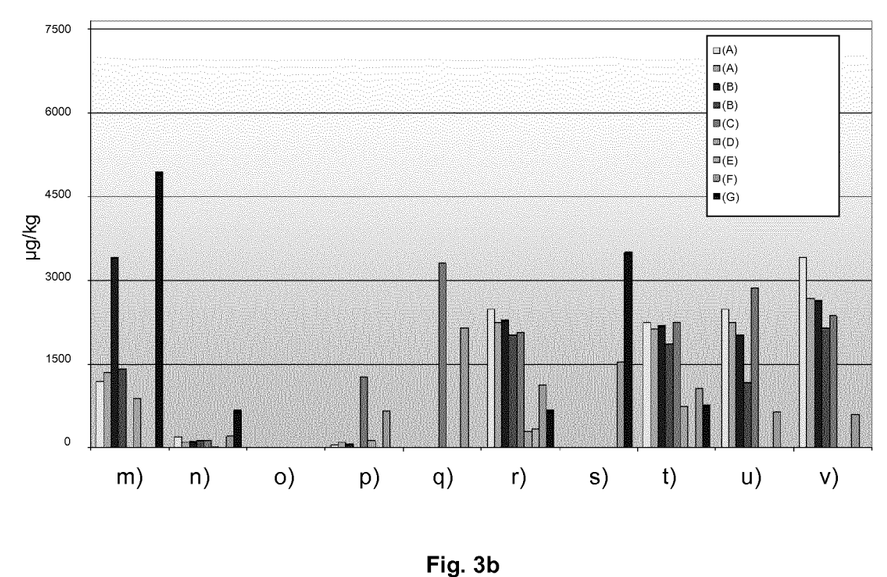

The commercially SBC granules were then carefully degassed at 45° C. in a vacuum dryer for 48 hours. The organoleptically perceptible substances, which are contained in the degassed SBC granules, were measured again using headspace GC-MS. The measured values are graphically shown in FIGS. 3a and 3b. It is evident from these results that degassing of the commercially SBC granules signifacanity decreases the amounts of volatile organic compounds in the polymers. The exact measured values are graphically shown in FIGS. 3a and 3b.

Figure 4A:
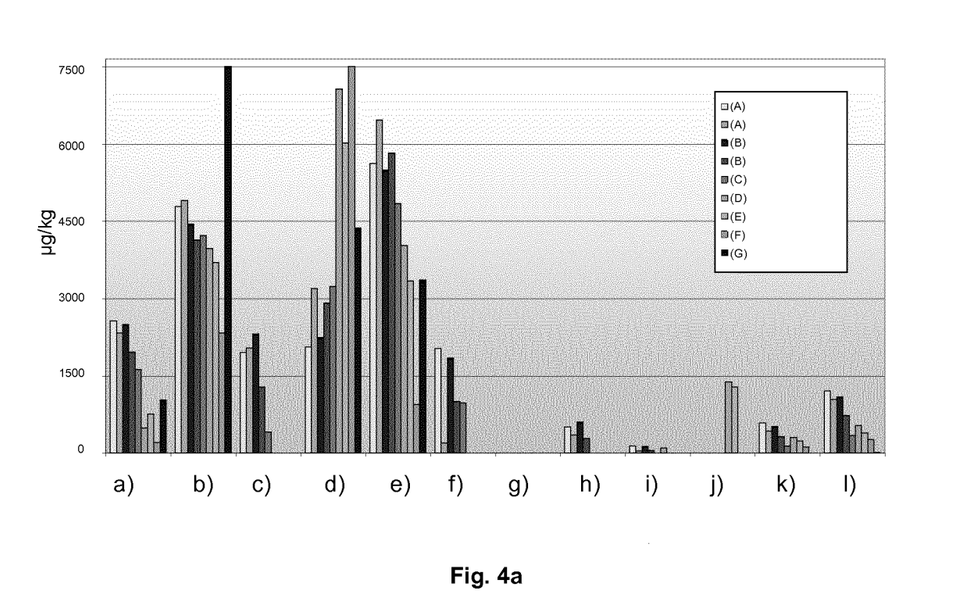
FIGS. 4a and 4b show the results of a headspace GC-MS chromatography of commercial SBC granules which were degassed at 45° C., re-granulated at 220-240° C. in a conventional process and then heated to 120° C. in an air-tight vial.
Figure 4B:
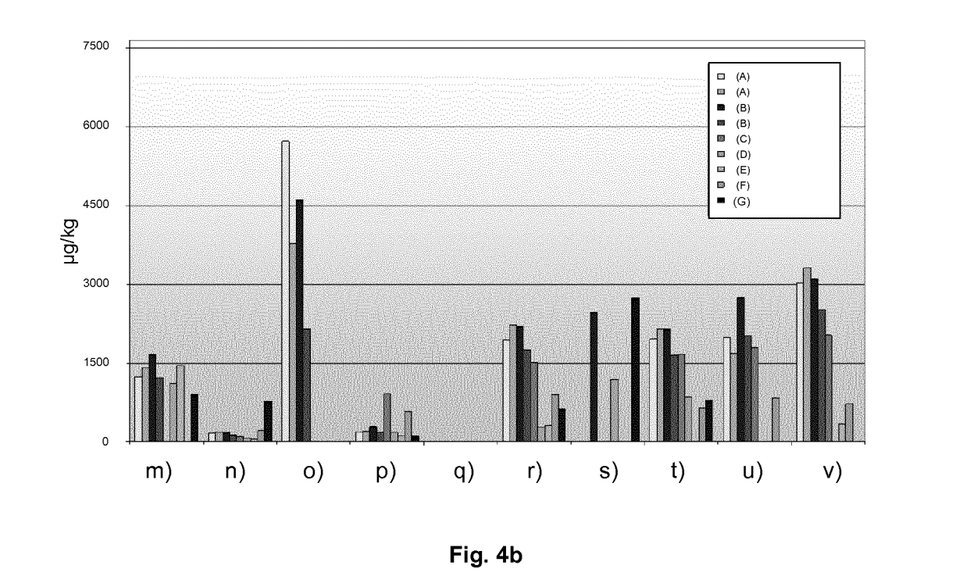

The headspace GC-MS measurements were repeated after the degassed SBC granules were re-granulated at 220-240° C. in a conventional process. The exact measured values are graphically shown in FIGS. 4a and 4b. As the content of most of the volatile organic compounds is dramatically increased upon re-granulation.

Effect of Water Injection During Polymer Processing

The effect of water injection during polymer processing was further investigated. A SBC sample comprising 1350 ppm Iragnox® 1010, 1350 ppm Sumilizer® GS and 1800 ppm Irgaphos® 168 was introduced to a degassing extruder after polymerization. Water was injected to the polymer melt discharge device of the extruder. Water was injected between the second and the third degassing dome and between the third and the fourth degassing dome of the extruder in a continuous fashion. Two different levels of water injection (normal, indicated as $W_n$, and increased, indicated as $W_i$) were applied. The normal settings are around 30 liter/hour for each injection point for around 13 m$^3$/hour polymer resin passing through the extruder. The increased amount of water was increased by 10-60 wt.-% of the normal settings.

Figure 5:
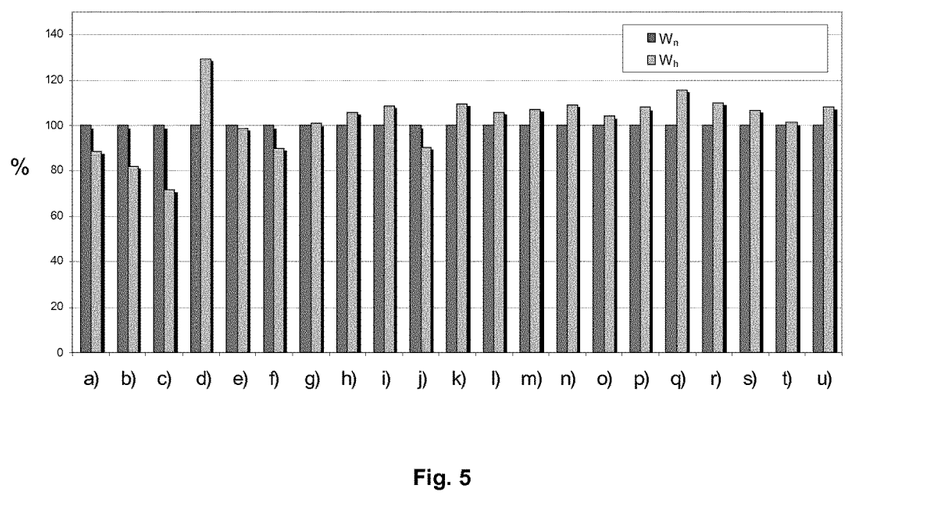
FIG. 5 shows the effect of increased water injection to the extruder on the formation of volatile organic compounds during the processing of SBC granules.

It was found that increased water injection results in an overall decreased amount of acetaldehyde, methacrolein and styrene. The results are shown in FIG. 5. The amounts are given in percent (%) relative to the process with normal water injection $W_n$ set as 100%

Effect of Stabilizer

The effect of stabilizer addition was further investigated. A reaction mixture comprising Styroclear® GH 62 in cyclohexane as obtained from the polymerization process was admixed with different stabilizing agents. The compositions are indicated in the following Table 3:

| Designation | Composition |
| --- | --- |
| (C) | Styroclear® GH 62 |
| (S1) | (S3) + (S4) + (S5) in ratio 1:1:1.33 (1350 ppm:1350 ppm:1800 ppm) |
| (S2) | (S3) + (S4) + (S5) in ratio 1:1:1 |
| (S3) | pentaerythritol-tetrakis(3-(3,5-di-tert-butyl-4-hydroxyphenyl)propionate (commercially available as IRGANOX® 1010) |
| (S4) | 2-[1-(2-hydroxy-3,5-di-tert-pentylphenyl)ethyl]-4,6-di-tert-pentylphenylacrylate (commercially available SUMILIZER® GS) |
| (S5) | tris(2,4-di-t-butylphenyl)phosphite (commercially available as IRGAFOS® 168) |
| (S6) | octadecyl-3-(3,5-di-tert-butyl-4-hydroxyphenyl)propionate (commercially available as IRGANOX® 1076) |

The resulting mixture was introduced to an extruder after polymerization and the organoleptically perceptible substances were measured again using headspace GC-MS after processing was completed.

Figure 6:
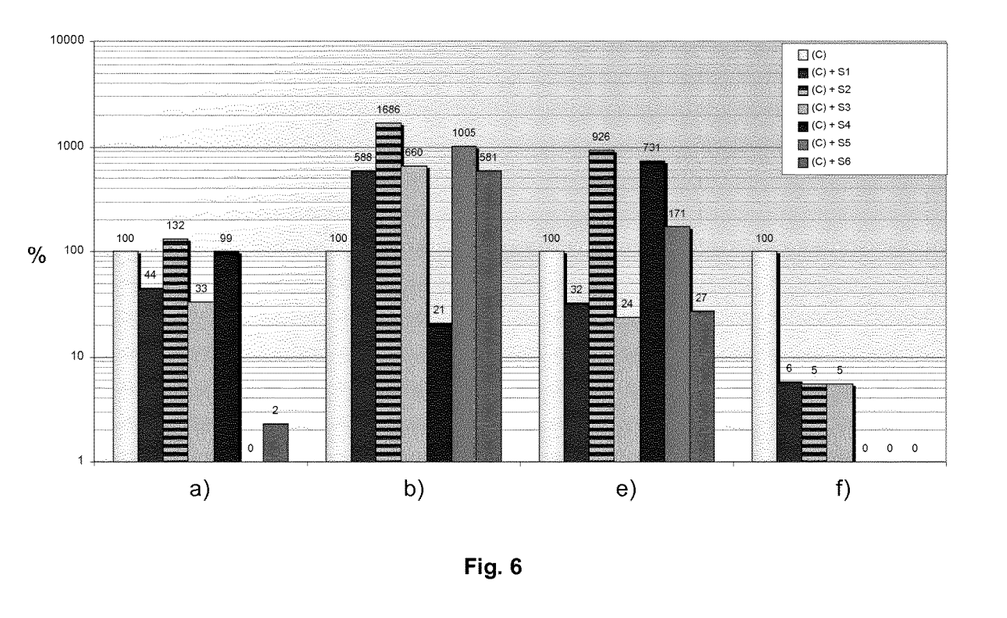
FIG. 6 shows the effect of different stabilizers on the formation of volatile organic compounds during the processing of SBC granules.

The results are shown in FIG. 6. As can be seen, the addition of stabilizers results in overall reduced formation of volatile organic compounds, in particular methacroleine.

The invention claimed is:

1. A method for processing a vinyl aromatic/diene-block copolymer A, obtained by an anionic polymerization of a monomer composition, comprising:
   A1: 60-95 wt.-%, based on the total weight of the monomer composition, of at least one vinyl aromatic monomer, and
   A2: 5-40 wt.-%, based on the total weight of the monomer composition, of at least one diene monomer,
   or a polymer composition P comprising at least one vinyl aromatic/diene-block copolymer A and at least one styrene homopolymer or styrene copolymer;
   wherein a polymer melt is formed from the vinyl aromatic/diene-block copolymer A or the polymer composition P and water is dosed to the polymer melt during the processing;
   wherein
   the vinyl aromatic/diene-block copolymer A in total comprises less than 10 parts per million (ppm) of acetaldehyde, methacrolein, and styrene based on the total amount of vinyl aromatic/diene-block copolymer A; and the vinyl aromatic/diene-block copolymer A further comprises at least one stabilizer, selected from a phenol-based stabilizer or a phosphite-based stabilizer; and
   wherein the oxygen concentration of the ambient air in contact with the polymer melt is reduced.

2. The method according to claim 1, wherein the vinyl aromatic/diene-block copolymer A in total comprises less than 400 ppm, based on the total amount of vinyl aromatic/diene-block copolymer A, of the following volatile organic compounds: acetaldehyde, isobutene, ethanol, acroleine, propanal, methacroleine, 2-methylpentane, 3-methalpentane, 2-methyl-2-butanol, methylcyclopentane, 4-vinylcyclohexene, ethylbenzene, phenylacetylene, styrene, o-xylene, isopropylbenzene, allylbenzene, n-propylbenzene, α-methylstyrene, cyclohexane, and n-hexane.

3. The method according to claim 1, wherein the vinyl aromatic/diene-block copolymer A in total comprises less than 100 ppm, based on the total amount of vinyl aromatic/diene-block copolymer A and disregarding the presence of cyclohexane and n-hexane, of the following volatile organic compounds: acetaldehyde, isobutene, ethanol, acroleine, propanal, methacroleine, 2-methylpentane, 3-methalpentane, 2-methyl-2-butanol, methylcyclopentane, 4-vinylcyclohexene, ethylbenzene, phenylacetylene, styrene, o-xylene, isopropylbenzene, allylbenzene, n-propylbenzene, and α-methylstyrene.

4. The method according to claim 1, wherein the at least one vinyl aromatic monomer is selected from styrene, α-methyl styrene, and mixtures thereof and the at least one diene monomer is selected from 1,3-butadiene and 2-methyl-1,3-butadiene.

5. The method according to claim 1, wherein the polymer melt is provided in a polymer melt discharge device and the oxygen concentration compared to ambient air is reduced by providing the polymer melt discharge device with a sealing.

6. The method according to claim 5, wherein the sealing of the polymer melt discharge device is obtained by continuously feeding of the polymer melt to the polymer melt discharge device.

7. The method according to claim 1, wherein a chemically inert fluid, selected from at least one chemical inert solvent and at least one chemical inert gas, is fed to the polymer melt discharge device.

8. The method according to claim 1, wherein the vinyl aromatic/diene-block copolymer A in total comprises less than 5 ppm of acetaldehyde, methacrolein, and styrene.

9. The method according to claim 1, wherein the vinyl aromatic/diene-block copolymer A in total comprises less than 2 ppm of acetaldehyde, methacrolein, and styrene.

10. The method according to claim 2, wherein the vinyl aromatic/diene-block copolymer A in total comprises less than 200 ppm, based on the total amount of vinyl aromatic/ diene-block copolymer A, of the following volatile organic compounds: acetaldehyde, isobutene, ethanol, acroleine, propanal, methacroleine, 2-methylpentane, 3-methalpentane, 2-methyl-2-butanol, methylcyclopentane, 4-vinylcyclohexene, ethylbenzene, phenylacetylene, styrene, o-xylene, isopropylbenzene, allylbenzene, n-propylbenzene, α-methylstyrene, cyclohexane, and n-hexane.

11. The method according to claim 3, wherein the vinyl aromatic/diene-block copolymer A in total comprises less than 50 ppm, based on the total amount of vinyl aromatic/diene-block copolymer A and disregarding the presence of cyclohexane and n-hexane, of the following volatile organic compounds: acetaldehyde, isobutene, ethanol, acroleine, propanal, methacroleine, 2-methylpentane, 3-methalpentane, 2-methyl-2-butanol, methylcyclopentane, 4-vinylcyclohexene, ethylbenzene, phenylacetylene, styrene, o-xylene, isopropylbenzene, allylbenzene, n-propylbenzene, and α-methylstyrene.

12. The method according to claim 3, wherein the vinyl aromatic/diene-block copolymer A in total comprises less than 30 ppm, based on the total amount of vinyl aromatic/diene-block copolymer A and disregarding the presence of cyclohexane and n-hexane, of the following volatile organic compounds: acetaldehyde, isobutene, ethanol, acroleine, propanal, methacroleine, 2-methylpentane, 3-methalpentane, 2-methyl-2-butanol, methylcyclopentane, 4-vinylcyclohexene, ethylbenzene, phenylacetylene, styrene, o-xylene, isopropylbenzene, allylbenzene, n-propylbenzene, and α-methylstyrene.

13. The method according to claim 7, wherein the at least one chemical inert solvent is a liquid hydrocarbon and the at least one chemical inert gas is $CO_2$, nitrogen, and/or argon.

* * * * *